United States Patent [19]

Strickland

[11] Patent Number: 5,638,843

[45] Date of Patent: Jun. 17, 1997

[54] PORTABLE COLLAPSIBLE CAR WASH SHOWER

[76] Inventor: Johnnie Strickland, 45 Hazelwood Ave., Newark, N.J. 07106

[21] Appl. No.: 550,109

[22] Filed: Oct. 30, 1995

[51] Int. Cl.$^6$ .................................................. B08B 3/02
[52] U.S. Cl. ........................ 134/123; 134/198; 134/201; 239/600
[58] Field of Search ...................... 134/45, 123, 198, 134/201; 239/600; 138/106; 248/67, 60, 79.2

[56] References Cited

U.S. PATENT DOCUMENTS

| 2,465,562 | 3/1949 | Hopper et al. | 134/123 |
| 2,676,600 | 4/1954 | Vani et al. | 134/123 |
| 2,698,629 | 1/1955 | Hall | 134/123 |
| 3,072,131 | 1/1963 | Laurenzio | 134/123 |
| 3,368,571 | 2/1968 | Honoeof | 134/123 |
| 3,459,203 | 8/1969 | Pritchard | 134/123 |
| 4,739,779 | 4/1988 | Jones et al. | 134/123 |
| 4,899,965 | 2/1990 | Usui | 138/106 |
| 4,936,330 | 6/1990 | Lahue | 134/123 |
| 5,255,695 | 10/1993 | Downey | 134/123 |

FOREIGN PATENT DOCUMENTS

| 512466 | 7/1952 | Belgium | 134/123 |
| 22963 | 11/1956 | Germany | 134/123 |
| 1059920 | 2/1967 | United Kingdom | 134/123 |

Primary Examiner—Frankie L. Stinson

[57] ABSTRACT

A portable collapsible car wash shower for dispensing water onto an exterior of a car. The inventive device includes a pair of vertical conduits and an overhead conduit extending therebetween such that a vehicle can be driven between and beneath the conduits. A plurality of spray nozzles project interiorly from the conduits to spray water onto the associated vehicle. The conduits are connected together by selectively flexible corner couplings which permit the conduits to be selectively pivoted into a parallel orientation for storage.

7 Claims, 3 Drawing Sheets

PORTABLE COLLAPSIBLE CAR WASH SHOWER

BACKGROUND OF THE INVENTION

1. Field of the Invention

The present invention relates to fluid spray washing devices and more particularly pertains to a portable collapsible car wash shower for dispensing water onto an exterior of a car.

2. Description of the Prior Art

The use of fluid spray washing devices is known in the prior art. More specifically, fluid spray washing devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art fluid spray washing devices include U.S. Pat. No. 4,519,544; U.S. Pat. No. 5,224,652; U.S. Pat. No. 4,784,329; U.S. Pat. No. 4,546,903; U.S. Pat. No. 3,454,042; and U.S. Design Pat. No. 343,938.

While these devices fulfill their respective, particular objectives and requirements, the aforementioned patents do not disclose a portable collapsible car wash shower for dispensing water onto an exterior of a car which includes a pair of vertical conduits and an overhead conduit extending therebetween such that a vehicle can be driven between and beneath the conduits, and a plurality of spray nozzles project interiorly from the conduits to spray water onto the associated vehicle, wherein the conduits are connected together by selectively flexible corner couplings which permit the conduits to be selectively pivoted into a parallel orientation for storage.

In these respects, the portable collapsible car wash shower according to the present invention substantially departs from the conventional concepts and designs of the prior art, and in so doing provides an apparatus primarily developed for the purpose of dispensing water onto an exterior of a car.

SUMMARY OF THE INVENTION

In view of the foregoing disadvantages inherent in the known types of fluid spray washing devices now present in the prior art, the present invention provides a new portable collapsible car wash shower construction wherein the same can be utilized for the purpose of dispensing water onto an exterior of a car. As such, the general purpose of the present invention, which will be described subsequently in greater detail, is to provide a new portable collapsible car wash shower apparatus and method which has many of the advantages of the fluid spray washing devices mentioned heretofore and many novel features that result in a portable collapsible car wash shower which is not anticipated, rendered obvious, suggested, or even implied by any of the prior art fluid spray washing devices, either alone or in any combination thereof.

To attain this, the present invention generally comprises a portable collapsible car wash shower for dispensing water onto an exterior of a car. The inventive device includes a pair of vertical conduits and an overhead conduit extending therebetween such that a vehicle can be driven between and beneath the conduits. A plurality of spray nozzles project interiorly from the conduits to spray water onto the associated vehicle. The conduits are connected together by selectively flexible corner couplings which permit the conduits to be selectively pivoted into a parallel orientation for storage.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable collapsible car wash shower apparatus and method which has many of the advantages of the fluid spray washing devices mentioned heretofore and many novel features that result in a portable collapsible car wash shower which is not anticipated, rendered obvious, suggested, or even implied by any of the prior art fluid spray washing devices, either alone or in any combination thereof.

It is another object of the present invention to provide a new portable collapsible car wash shower which may be easily and efficiently manufactured and marketed.

It is a further object of the present invention to provide a new portable collapsible car wash shower which is of a durable and reliable construction.

An even further object of the present invention is to provide a new portable collapsible car wash shower which is susceptible of a low cost of manufacture with regard to both materials and labor, and which accordingly is then susceptible of low prices of sale to the consuming public, thereby making such portable collapsible car wash showers economically available to the buying public.

Still yet another object of the present invention is to provide a new portable collapsible car wash shower which provides in the apparatuses and methods of the prior art some of the advantages thereof, while simultaneously overcoming some of the disadvantages normally associated therewith.

Still another object of the present invention is to provide a new portable collapsible car wash shower for dispensing water onto an exterior of a car.

Yet another object of the present invention is to provide a new portable collapsible car wash shower which includes a pair of vertical conduits and an overhead conduit extending therebetween such that a vehicle can be driven between and beneath the conduits, and a plurality of spray nozzles project interiorly from the conduits to spray water onto the associated vehicle, wherein the conduits are connected together by selectively flexible corner couplings which permit the conduits to be selectively pivoted into a parallel orientation for storage.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
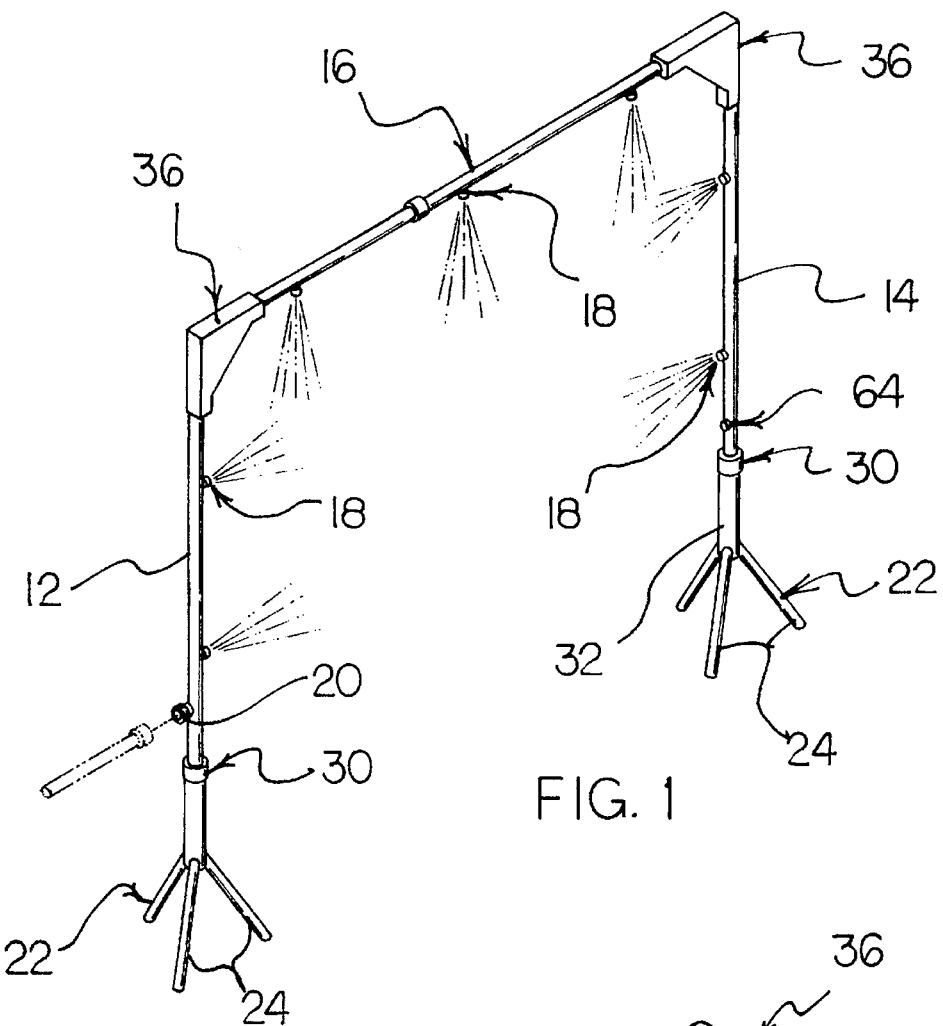
FIG. 1 is an isometric view of a portable collapsible car wash shower according to the present invention.

With reference now to the drawings, and in particular to FIGS. 1–6 thereof, a new portable collapsible car wash shower embodying the principles and concepts of the present invention and generally designated by the reference numeral 10 will be described.

More specifically, it will be noted that the portable collapsible car wash shower 10 comprises a first vertical conduit 12 and a second vertical conduit 14 positioned in a spaced orientation. An overhead conduit 16 extends between upper ends of the vertical conduits 12 and 14. A plurality of spray nozzles 18 extend from interior surfaces of the conduits and within fluid communication therewith for dispensing water from the conduits onto a vehicle positionable between the conduits. A hose coupling 20 is directed into communication with the first vertical conduit and permits coupling of the device to a pressurized fluid source such as a hose, faucet, or power washer. By this structure, water or a soapy water mixture injected into the conduits 12–16 will be dispensed onto a vehicle for a car washing procedure.

Figure 4:
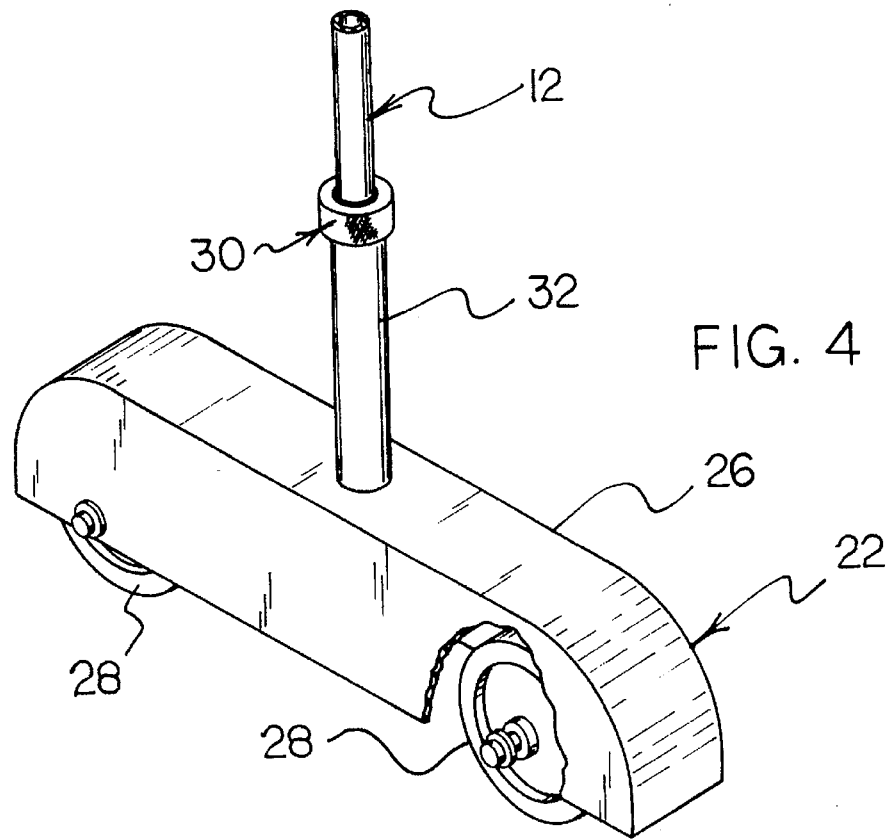
FIG. 4 is an enlarged isometric illustration of an alternative form of a ground engaging means of the invention.

As shown in FIG. 1, the present invention 10 may further comprise a ground engaging means 22 for engaging a ground surface and supporting the vertical conduits in a vertical orientation relative to the ground surface. To this end, the ground engaging means may comprise a plurality of legs 24 mounted relative to and extending radially outwardly from a lower end of the respective vertical conduits 12 and 14. Alternatively, and as shown in FIG. 4, the ground engaging means 22 may comprise a pair of wheel frames 26 mounted relative to a lower end of the respective vertical conduits 12 and 14. At least one wheel 28 is mounted to each of the wheel frames 26 so as to facilitate rolling traversing of the device 10 across a ground surface as desired.

To permit selective adjustment of a height of each of the vertical conduits, a height adjusting means 30 can be provided and includes a receiving member 32 slidably positioned over the lower end of the respective vertical conduit 12 or 14, and a tapered locking collar 34 threadably engaged to an upper end of the receiving member 32. The ground engaging means 22 is mounted to a lower end of the receiving member so as to support the respective vertical conduits in the vertical orientation. By this structure, the receiving member can be positioned in a desired axial location along the respective vertical member 12 or 14, with the locking collar being subsequently operable to effect radial compression of the receiving member about an exterior circumference of the lower end of the vertical member.

Figure 2:
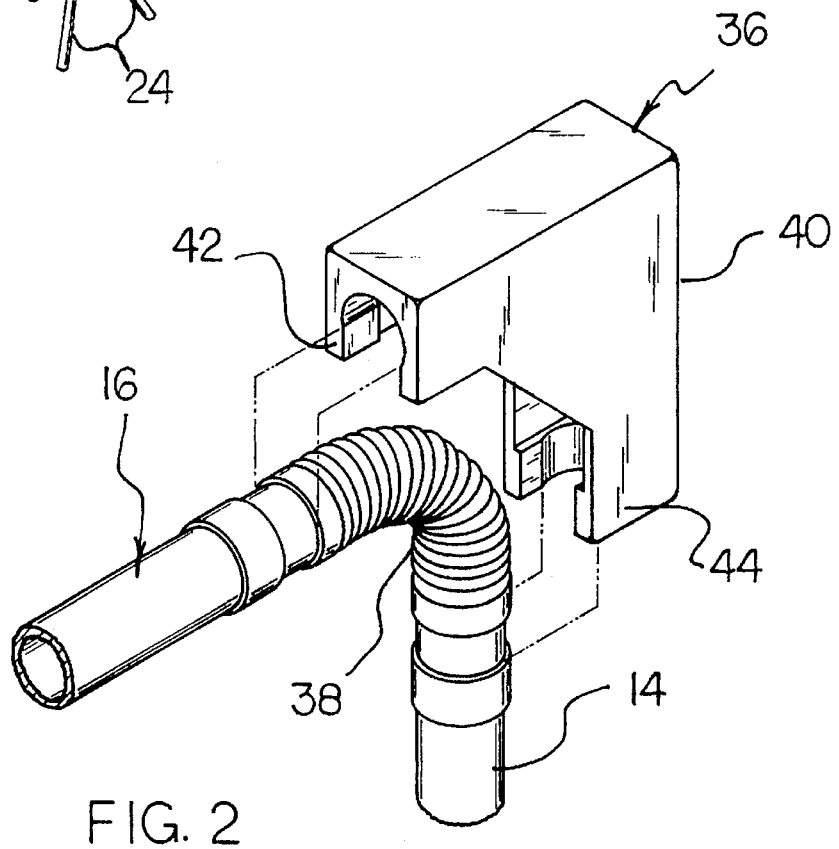
FIG. 2 is an enlarged isometric illustration of a selectively flexible corner means of the present invention.
Figure 3:
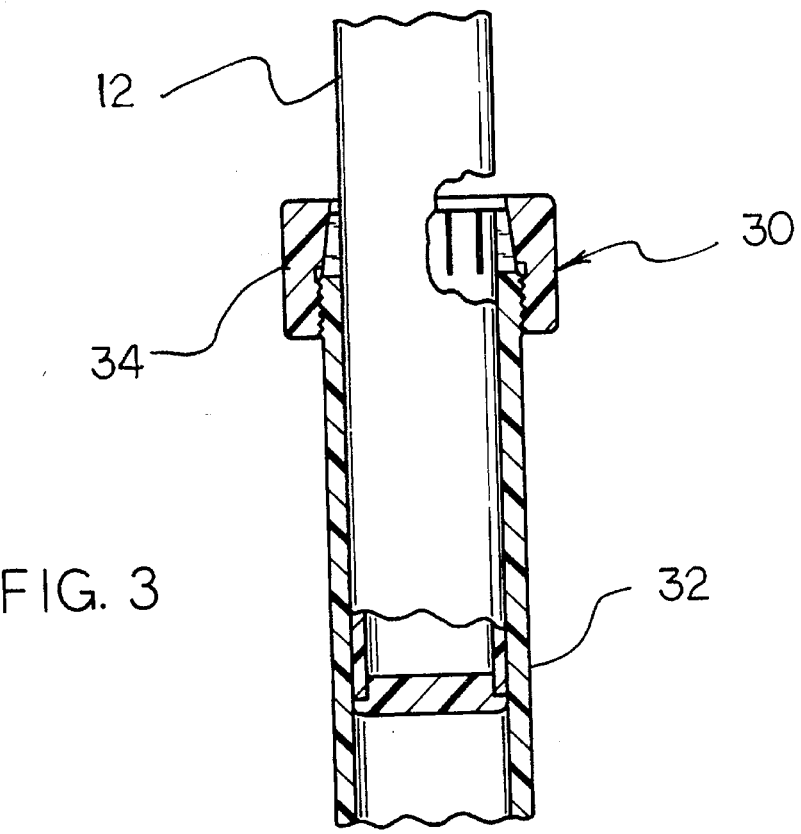
FIG. 3 is a cross sectional view of a height adjusting means of the invention.

As shown in FIG. 2, the present invention preferably includes a pair of selectively flexible corner means 36 each extending between an end of the overhead conduit 16 and a respective one of the vertical conduits 12 and 14 for selectively locking the vertical conduits in an orthogonal orientation relative to the overhead conduit and for permitting the conduits to be selectively pivoted into a parallel orientation for storage. To this end, each of the selectively flexible corner means 36 comprises a flexible corner conduit 38 coupled to and extending between the end of the overhead conduit and an upper end of an individual one of the vertical conduits 12 or 14. A locking member 40 includes a hollow interior for receiving the flexible corner conduit therein. The locking member further includes a first resilient clamp 42 for clamping onto the overhead conduit, and a second resilient clamp 44 for clamping onto the respective vertical conduit 12 or 14. The resilient clamps 42 and 44 are oriented at an orthogonal orientation relative to one another such that the overhead conduit 16 is held at an orthogonal orientation relative to the respective vertical conduit 12 or 14 when the locking member is engaged therewith.

Figure 5:
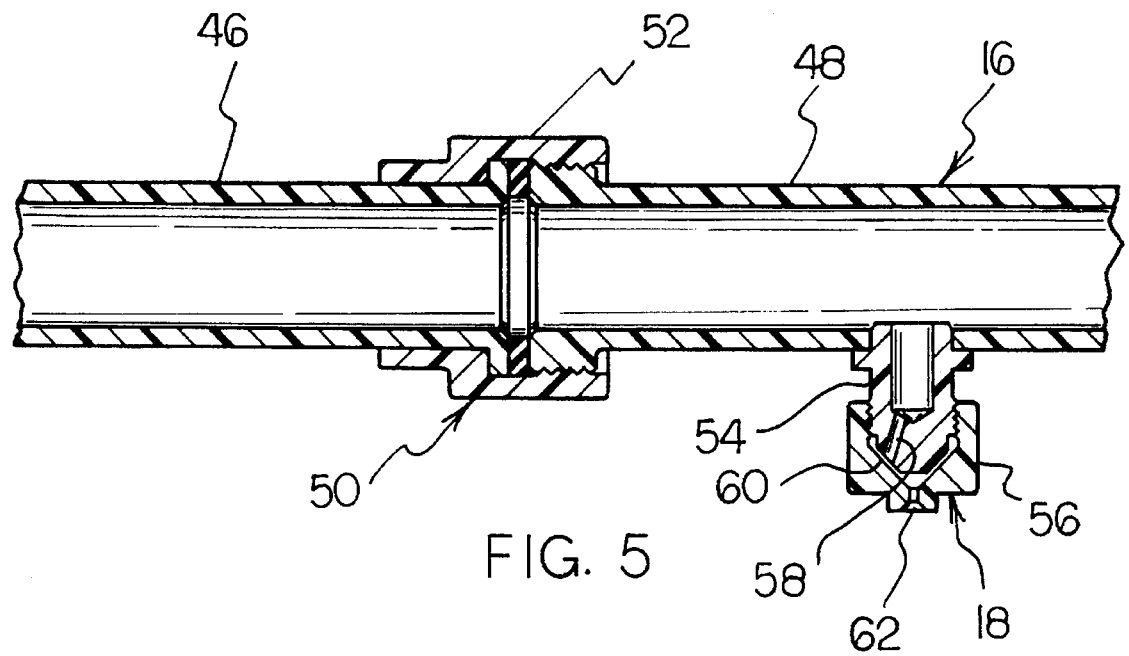
FIG. 5 is a cross sectional view of a coupler of the invention.

As shown in FIG. 5, the overhead conduit 16 may be comprised of a first portion 46 and a second portion 48 coupled together by a coupler 50. To this end, the coupler 50 comprises an internally threaded coupling collar 52 which is rotatably mounted to an end of the first portion 46 and can be threadably engaged to an end of the second portion 48 of the overhead conduit 16 to couple the portions together in a collinear orientation.

As further shown in FIG. 5, the spray nozzles 18 may each comprise a nozzle conduit 54 projecting from a respective one of the conduits 12–16, and an adjustable nozzle cap 56 threadably coupled to an outer distal end of the nozzle conduit 54. The nozzle conduit 54 is shaped so as to define an offset aperture 58 extending therethrough which is positioned for abutting engagement with an interior surface 60 of the nozzle cap 56. A dispensing aperture 62 is directed through the adjustable nozzle cap 56 to permit egress and atomization or spraying of fluid from the nozzle 18. By this structure, the adjustable nozzle cap 56 can be rotated into a desired axial orientation relative to the nozzle conduit 54 so as to position the offset aperture 58 a desired distance from the interior surface of the adjustable nozzle cap 56 to limit an amount of fluid dispensed through the nozzle 18.

Figure 6:
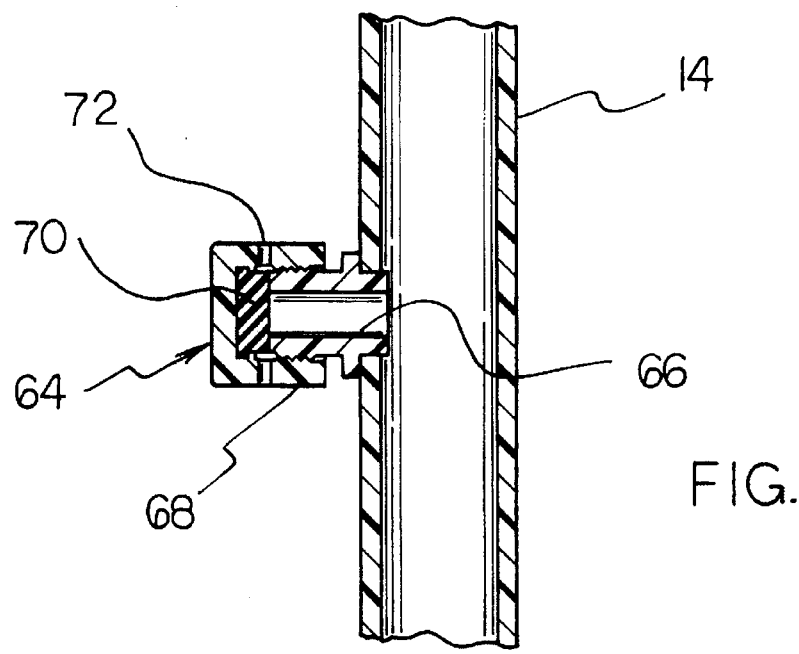
FIG. 6 is a cross sectional view of a drain of the invention.

As shown in FIG. 6, the present invention 10 may include a drain 64 coupled to one of the conduits 12–16 for draining fluid therefrom subsequent to use of the device 10. To this end, the drain 64 comprises a drain conduit 66 mounted in fluid communication with the second vertical conduit 14, and a drain cap 68 threadably mounted to an outer end of the drain conduit. The drain cap 68 includes a seal 70 which normally closes the outer end of the drain conduit 66, but which allows fluid communication therethrough when the seal is backed from the drain conduit 66 by a rotation or loosening of the drain cap 68. The drain cap 68 is shaped so as to define laterally extending drain apertures 72 which fluidly communicate with the drain conduit 66 when the drain cap is loosened to allow for drainage of fluid from the second vertical conduit 14.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A portable collapsible car wash shower comprising:

a first vertical conduit and a second vertical conduit positioned in a spaced orientation;

an overhead conduit extending between upper ends of the vertical conduits;

a plurality of spray nozzles extending from interior surfaces of the conduits and within fluid communication therewith for dispensing water from the conduits onto a vehicle positionable between the conduits;

a hose coupling directed into communication with the first vertical conduit and permitting fluid coupling of the conduit to a pressurized fluid source;

a pair of selectively flexible corner means extending between an end of the overhead conduit and a respective one of the vertical conduits for selectively locking the vertical conduits in an orthogonal orientation relative to the overhead conduit and for permitting the conduits to be selectively pivoted for storage, each of the selectively flexible corner means comprises a flexible corner conduit coupled to and extending between the end of the overhead conduit and an upper end of a respective one of the vertical conduits; a removable locking member including a hollow interior receiving the flexible corner conduit therein, the removable locking member further including a first resilient clamp clamped onto the overhead conduit, and a second resilient clamp clamped onto the respective vertical conduit, the resilient clamps being oriented at an orthogonal orientation relative to one another such that the overhead conduit is held at an orthogonal orientation relative to the respective vertical conduit;

a pair of ground engaging means for engaging a ground surface and supporting the vertical conduits in a vertical orientation relative to the ground surface, the ground engaging means each comprise three equally spaced and angularly disposed legs mounted relative to and extending radially outwardly from a lower end of a respective vertical conduit.

2. The portable collapsible car wash shower of claim 1, and further comprising a pair of height adjusting means for permitting selective adjustment of a height of a respective one of the vertical conduits.

3. The portable collapsible car wash shower of claim 2, wherein the height adjusting means each comprise a receiving member slidably positioned over the lower end of the respective one of the vertical conduits; and a tapered locking collar threadably engaged to an upper end of the receiving member, with the ground engaging means being mounted to a lower end of the receiving member so as to support the respective one of the vertical conduits in the vertical orientation, wherein the receiving member can be positioned in a predetermined axial location along the respective vertical member, with the locking collar being subsequently operable to effect radial compression of the receiving member about an exterior circumference of the lower end of the vertical member.

4. The portable collapsible car wash shower of claim 3, wherein the overhead conduit comprises a first portion and a second portion coupled together by a coupler.

5. The portable collapsible car wash shower of claim 4, wherein the coupler comprises an internally threaded coupling collar rotatably mounted to an end of the first portion and threadably engaged to an end of the second portion of the overhead conduit to couple the portions together in a collinear orientation.

6. The portable collapsible car wash shower of claim 5, wherein the spray nozzles each comprise a nozzle conduit projecting from a respective one of the conduits; and adjustable nozzle cap threadably coupled to an outer distal end of the nozzle conduit, with the nozzle conduit being shaped so as to define an offset aperture extending therethrough which is positioned for abutting engagement with an interior surface of the nozzle cap; and a dispensing aperture directed through the adjustable nozzle cap to permit egress and atomization or spraying of fluid from the nozzle, wherein the adjustable nozzle cap can be rotated into a desired axial orientation relative to the nozzle conduit so as to position the offset aperture a desired distance from the interior surface of the adjustable nozzle cap to limit an amount of fluid dispensed through the nozzle.

7. The portable collapsible car wash shower of claim 6, and further comprising a drain coupled to one of the conduits for draining fluid therefrom subsequent to use of the shower, the drain comprising a drain conduit mounted in fluid communication with the second vertical conduit, and a drain cap threadably mounted to an outer end of the drain conduit, the drain cap including a seal which normally closes the outer end of the drain conduit, but which allows fluid communication therethrough when the seal is backed from the drain conduit by a rotatable loosening of the drain cap, the drain cap being shaped so as to define laterally extending drain apertures which fluidly communicate with the drain conduit when the drain cap is loosened to allow for drainage of fluid from the second vertical conduit.

\* \* \* \* \*